(12) United States Patent
Yoshida (10) Patent No.: US 7,701,659 B2
(45) Date of Patent: Apr. 20, 2010

(54) ELECTRONIC APPARATUS HAVING BUILT-IN HARD DISK DEVICE

(75) Inventor: Shinji Yoshida, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 292 days.

(21) Appl. No.: 11/907,356

(22) Filed: Oct. 11, 2007

(65) Prior Publication Data

US 2008/0094741 A1    Apr. 24, 2008

(30) Foreign Application Priority Data

Oct. 14, 2006    (JP) .................. 2006-008359 U (51) Int. Cl.
G11B 15/18    (2006.01)
(52) U.S. Cl. ...................................... 360/69
(58) Field of Classification Search ............. 360/69, 360/55
See application file for complete search history.

(56) References Cited

U.S. PATENT DOCUMENTS

| | | | | |
|---|---|---|---|---|
| 5,355,121 | A * | 10/1994 | Naito et al. .............. | 340/584 |
| 6,922,622 | B2 * | 7/2005 | Dulin et al. .............. | 701/45 |
| 7,317,389 | B2 * | 1/2008 | Yokota ..................... | 340/540 |
| 7,460,325 | B2 * | 12/2008 | Yoshida ................... | 360/69 |
| 7,471,999 | B2 * | 12/2008 | Taki ........................ | 701/33 |
| 7,502,190 | B2 * | 3/2009 | Yoshida ................... | 360/69 |
| 2002/0181132 | A1 * | 12/2002 | Ito ........................... | 360/31 |
| 2006/0247832 | A1 * | 11/2006 | Taki ........................ | 701/33 |
| 2007/0165322 | A1 * | 7/2007 | Strom et al. .............. | 360/69 |

FOREIGN PATENT DOCUMENTS

| | | |
|---|---|---|
| JP | 3-268291 A | 11/1991 |
| JP | 5-258546 | 10/1993 |
| JP | 6-67910 A | 3/1994 |
| JP | 2002-324391 A | 11/2002 |
| JP | 2003-297025 | 10/2003 |
| JP | 2003-323789 | 11/2003 |

* cited by examiner

*Primary Examiner*—Fred Tzeng
(74) *Attorney, Agent, or Firm*—Morgan, Lewis & Bockius LLP (57) ABSTRACT

A hard disk device has a temperature detection device operable to detect a temperature in the hard disk device. A controlling section is operable to control functions of an electronic apparatus. A notifying section is operable to notify an abnormality of the electronic apparatus. The controlling section acquires the temperature detected by the temperature detection device from the hard disk device. The controlling section controls the notifying section to notify the abnormality of the electronic apparatus when the acquired temperature is higher than a reference temperature.

10 Claims, 6 Drawing Sheets

ELECTRONIC APPARATUS HAVING BUILT-IN HARD DISK DEVICE

The disclosure of Japanese Utility Model Application No. 2006-008359 filed Oct. 14, 2006 including specification, drawings and claims is incorporated herein by reference in its entirety.

BACKGROUND

The present invention relates to an electronic apparatus having a built-in hard disk device that is provided with a thermistor sensor for detecting an internal temperature of the hard disk device, and when the internal temperature detected by the thermistor sensor at the time of recording information is higher than a predetermined temperature, the hard disk device executing a self-diagnosis function to read out the once recorded information again, thus verifying the contents of the recorded information. For example, the invention relates to an electronic apparatus such as a DVD recorder having a built-in hard disk device or a liquid crystal TV having a built-in hard disk device.

In the past, in various kinds of electronic apparatuses such as a DVD recorder or a liquid crystal TV, there has been employed a technique in which a temperature sensor is disposed inside the apparatus to monitor the internal temperature of the apparatus, and when the internal temperature of the apparatus abnormally rises, a cooling fan is driven, or the abnormality is notified to a user, for example, by displaying an error message, thereby preventing a possible malfunction of the apparatus (see Patent Documents 1 to 4, for example).

A recording device disclosed in Patent Document 1 is a DVD video recorder with a hard disk drive (HDD). The recording device is configured such that a temperature detecting section such as a thermistor sensor directly detects the internal temperature of the recording device and when the internal temperature of the recording device excessively rises, the internal temperature of the recording device is lowered by controlling a cooling fan.

An optical information recording and reproducing device disclosed in Patent Document 2 is configured such that a thermistor sensor directly measures the internal temperature of the device and when it is detected that the measured temperature is higher than a predetermined value, the detection result is outputted to the outside to caution.

An information processing system with a temperature detection function disclosed in Patent Document 3 is provided with temperature detection means for directly detecting the internal temperature of a file memory device to prevent destruction of the file memory content which may caused by an access to the file memory device when the internal temperature is high. In the information processing system, it is determined whether or not the temperature detected by the temperature detection means is higher than a predetermined temperature. When the temperature is detected to be higher than the predetermined temperature, an operation of protecting the stored content is executed.

A disk device disclosed in Patent document 4 is provided with temperature detection means for directly detecting a temperature of the disk device. In the disk device, it is determined whether or not the temperature detected by the temperature detection means is within a range of temperature that guarantees a secure operation of the disk device. When it is determined that the detected temperature is outside the guarantee range, the disk device invalidate a write cash function and an automatic substitute function. When receiving a write command, the disk device executes verification after performing a write to the disk so as to confirm whether or not the write can be normally executed.

Patent Document 1: Japanese Patent Publication No. 2002-324391A

Patent Document 2: Japanese Patent Publication No. 03-268291A

Patent Document 3: Japanese Patent Publication No. 06-67910A

Patent Document 4: Japanese Patent Publication No. 2003-297025A

According to Patent Documents 1 to 4, the temperature detection means is provided inside a device of which the internal temperature is to be monitored. The internal temperature of the device is directly detected by the temperature detection means, and on the basis of the detected temperature, the control of the cooling fan, the display of the message, the write to the disk, or the like are performed. However, the respective devices disclosed in Patent Documents 1 to 4 require the temperature detection means for directly detecting the internal temperature of the device.

Recently, electronic apparatuses having a built-in hard disk drive (HDD) have become widely used as a recording medium. The hard disk drive has a large recording capacity and a very fast access speed. In this respect, such electronic apparatuses having the built-in hard disk drive will become more widely used.

Since the hard disk drive is used as an auxiliary memory device of a computer, the hard disk drive requires high reliability in information recording and reproduction. For this reason, the hard disk drive is generally hermetically enclosed in a metallic case. Various methods have been devised for controlling internal operations of the hard disk drive. For example, there is a method in which a thermistor sensor is installed in the hard disk drive to detect the internal temperature, and when the internal temperature of the hard disk drive detected by the thermistor sensor at the time of recording information is lower than a predetermined lower limit temperature or is higher than a predetermined upper limit temperature, the hard disk drive executes a self-diagnosis function (hereinafter, referred to as "write verification") to read out the once recorded information again, thus verifying the contents of the recorded information. In this case, the predetermined lower limit temperature is set to 20° C., for example. This is because if the information is recorded at a temperature lower than 20° C., the information may be improperly recorded. Meanwhile, the predetermined upper limit temperature is set to 60° C., for example. This is because if the information is recorded at a temperature higher than 60° C., the information may be improperly recorded.

As described above, the hard disk drive has the thermistor sensor inside the case as the temperature detection means for detecting the internal temperature, and the hard disk drive stores information about the temperature detected by the thermistor sensor.

SUMMARY

It is therefore an object of the invention to provide an electronic apparatus having a built-in hard disk device capable of acquiring information about temperature of the apparatus without requiring temperature detection means for directly detecting the internal temperature of the apparatus.

In order to achieve the above described object, according to an aspect of the invention, there is provided an electronic apparatus in which a hard disk device having a temperature detection device operable to detect a temperature in the hard disk device is incorporated, the electronic apparatus comprising:

a controlling section operable to control functions of the electronic apparatus; and a notifying section operable to notify an abnormality of the electronic apparatus, wherein:

the controlling section acquires the temperature detected by the temperature detection device from the hard disk device; and the controlling section controls the notifying section to notify the abnormality of the electronic apparatus when the acquired temperature is higher than a reference temperature.

According to another aspect of the invention, there is provided an electronic apparatus in which a hard disk device having a temperature detection device operable to detect a temperature in the hard disk device is incorporated, wherein when the hard disk device records information, in a case where the temperature detected by the temperature detection device is higher than a predetermined temperature, the hard disk device executes self-diagnostic function to read out and verify recorded information, the electronic apparatus comprising:

controlling section operable to control functions of the electronic apparatus; and a notifying section operable to notify an abnormality of the electronic apparatus, wherein:

the controlling section determines whether the hard disk device executes the self-diagnostic function;

the controlling section acquires the temperature detected by the temperature detection device from the hard disk device when the controlling section determines that the hard disk device executes the self-diagnostic function; and the controlling section controls the notifying section to notify the abnormality of the electronic apparatus when the acquired temperature is higher than a reference temperature.

According to the above aspects of the invention, the temperature in the hard disk device is used as a means for detecting a temperature in the apparatus. Thus, it is possible to omit an exclusive temperature detection section for detecting the temperature in the apparatus. In the above aspects of the invention, the temperature detection device which is operable to detect a temperature in the hard disk device may include a thermistor sensor.

When the temperature in the hard disk device increases, the temperature in the apparatus also increases accordingly. On the other hand, when the temperature in the apparatus increases due to an increase in temperature of other components in the apparatus, the temperature in the hard disk device rises due to the influence of the increase. Therefore, by taking advantage of the relation between the temperature in the hard disk device and the temperature in the apparatus having the hard disk device, it is possible to predict the temperature in the apparatus on the basis of the temperature acquired from the hard disk device without requiring the exclusive temperature detection section for detecting the temperature in the apparatus. Consequently, it is possible to signal a caution or warning message to inform the increase in the internal temperature of the apparatus.

Meanwhile, when the temperature in the hard disk device at the time of recording information is higher than a predetermined upper limit temperature, the hard disk device performs the self-diagnosis function (write verification) after recording the information. Thus, the control section of the electronic apparatus can predict the temperature state of the apparatus in a more accurate manner on the basis of the temperature acquired from the hard disk device and of whether the self-diagnosis function of the hard disk device is executed or not. Accordingly, it is possible to signal a caution or warning message to inform the increase in the temperature in the apparatus in a more accurate manner.

In the above aspects of the invention, the control section of the electronic apparatus confirms whether or not the hard disk device has executed the self-diagnosis function. When it is confirmed that the self-diagnosis function has been executed, the control means judges whether or not the acquired temperature is higher than the reference temperature. When it is confirmed that the acquired temperature is higher than the reference temperature, the abnormality of the apparatus is notified by the notifying section.

The reference temperature may include a first reference temperature (60° C., for example) and a second reference temperature (70° C., for example) which is higher than the first reference temperature;

the controlling section may control the notifying section to output a caution message (output a voice message or display a message, for example) indicating an first alert level to notify the abnormality of the electronic apparatus when the acquired temperature is higher than the first reference temperature;

the controlling section may control the notifying section to output a warning message (output a voice or display a message) indicating a second alert level which is higher than the first alert level to notify the abnormality of the electronic apparatus when the acquired temperature is higher than the second reference temperature.

As described above, since the abnormality of the apparatus is notified in two steps, a user can devise countermeasures such as turning off the apparatus in the initial step of outputting the caution message.

The electronic apparatus may further comprise a fan operable to cool the electronic apparatus, wherein the controlling section activates the fan when the acquired temperature is higher than the first reference temperature. As described above, since the cooling of the apparatus is started in an initial stage of the temperature increase, it is possible to prevent the increase in the temperature in the apparatus.

The controlling section may forcibly deactivate the electronic apparatus when the acquired temperature is higher than the second reference temperature. Since the apparatus is forcibly deactivated, it is possible to prevent a further increase in the temperature and thus to prevent the components of the apparatus from being destroyed by the temperature.

Even when the driving of the fan was started in response to the temperature acquired from the hard disk device being determined to be higher than the first reference temperature (60° C., for example), there may be a case in which the temperature acquired from the hard disk device become higher than the second reference temperature (70° C., for example). Such a phenomenon may occur when the fan is not actually operated (because the fan is in a lock state due to failures caused by natural deterioration with life or maintenance faults). Generally, in order to be informed of such a situation in the fan, a fan may be used having a detection circuit for directly detecting the driving of the fan. In the invention, however, when the temperature further increases to the second reference temperature after the driving of the fan, it is immediately determined that the fan is malfunctioning. Thus, it is possible to forcibly stop the operation of the apparatus. Therefore, it is not necessary to provide the detection circuit in the fan. Consequently, it is possible to use a low-cost fan and thus to reduce a component cost and further a manufacturing cost.

The temperature increase may result from the other causes other than the malfunctioning of the fan. Thus, in the above aspect of the invention, the controlling section may keep the fan activated when the electronic apparatus is forcibly deactivated. Since the fan is continuously driven, it is possible to prevent the temperature in the apparatus from increasing due to residual heat or the like after forcibly stopping the operation and it is possible to effectively lower the temperature in the apparatus.

According to the electronic apparatus having a built-in hard disk device of the invention, the temperature state in the apparatus is predicted on the basis of the temperature acquired from the hard disk device as means for detecting the temperature of the apparatus. Therefore, it is possible to omit the exclusive temperature detection section for detecting the temperature in the apparatus and thus to reduce the number of components and the manufacturing cost.

It is possible to notify the abnormality in the temperature in the apparatus on the basis of the temperature acquired from the hard disk device. In this case, since the abnormality of the apparatus is notified in two steps of the caution message and the warning message, a user can devise countermeasures such as turning off the electronic apparatus in the initial step of outputting the caution message.

When the temperature acquired from the hard disk device is higher than the first reference temperature, the fan may be driven. As described above, it is possible to prevent the increase in the temperature in the apparatus by staring the cooling of the apparatus in the initial stage of the temperature increase.

When the temperature acquired from the hard disk device is higher than the second reference temperature, the operation of the apparatus is forcibly stopped. Accordingly, it is possible to prevent a further temperature increase and thus to prevent the components of the apparatus from being destroyed by the temperature. In addition, even when the operation of the apparatus is forcibly stopped, the cooling fan is continuously driven. Accordingly, it is possible to prevent the internal temperature of the apparatus from increasing due to residual heat or the like after forcibly stopping the operation and it is possible to effectively lower the temperature in the apparatus.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Hereinafter, embodiments of the invention will be described with reference to the drawings.

Figure 1:
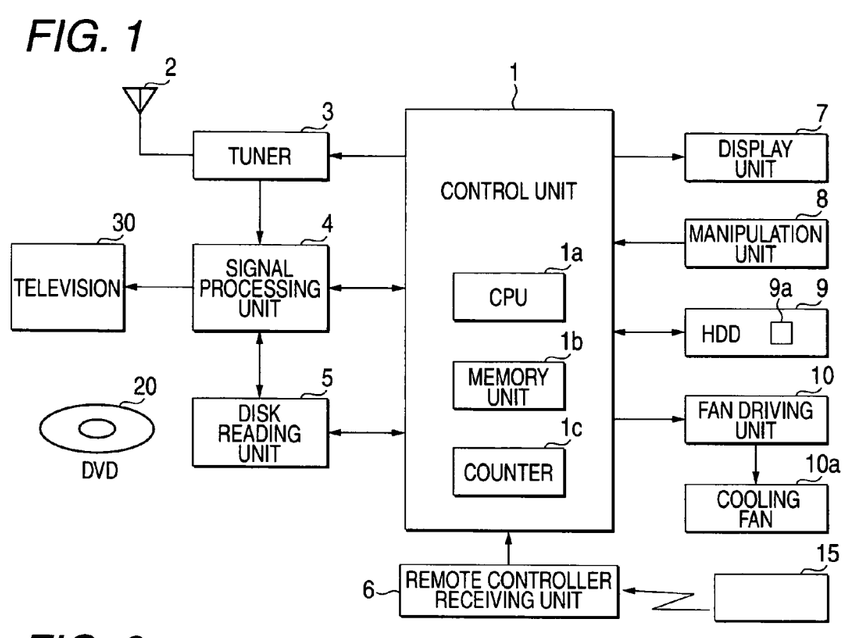
FIG. 1 is a block diagram illustrating an electrical configuration of a DVD recorder having a built-in hard disk drive (HDD) according to an embodiment of an electronic apparatus having a built-in hard disk device.

FIG. 1 is a block diagram illustrating an electrical configuration of a DVD recorder having a built-in hard disk drive (HDD) according to an embodiment of an electric apparatus having a built-in hard disk device of the invention.

The DVD recorder 1 having a built-in HDD according to Embodiment 1 includes a control unit 1, a tuner 3 connected to an antenna 2 for receiving broadcast signals (program information) such as TV programs, a signal processing unit 4, a disk reading unit 5 to or from which a DVD (Digital Versatile Disk) 20 as a recording medium is attachable or detachable, a remote controller receiving unit 6 for receiving control signals from a remote controller 15, a display unit 7, a manipulation unit 8, a built-in hard disk drive (HDD) 9, and a fan driving unit 10 for controlling a cooling fan 10a disposed in the DVD recorder 1. An output of the signal processing unit 4 is connected to a television set (hereinafter, referred to as a television) 30.

The control unit 1 includes a CPU 1a, a memory unit 1b, a counter 1c for counting time such as reproduction time or recording time, and the like. The memory unit 1b includes a ROM in which various programs of the recorder is stored, a RAM serving as an area for temporarily storing various data or performing works, and the like. The tuner 3 extracts analog signals including video from the broadcasting signals received by the antenna 2. The signal processing unit 4 includes a circuit for processing analog or digital signals. The signal processing unit 4 outputs the analog signals or digital signals inputted from the tuner 3, to the television 30, or the signal processing unit 4 digitalizes the analog signals; processes the digitalized signals into compressed data such as MPEG2 (Moving Picture Experts GroupPhase2) format; and then outputs the processed data to the disk reading unit 5 or the control unit 1.

The disk reading unit 5 includes a pickup, a pickup driving circuit, a disk driving circuit, and the like. The disk reading unit 5 writes the data outputted from the signal processing unit 4, on the DVD 20, or the disk reading unit 5 reads the data written on the DVD 20 and then outputs the read data to the signal processing unit 4. The signal processing unit 4 reproduces the data of the DVD 20 outputted from the disk reading unit 5, processes the reproduced data into analog signals, and then outputs the analog signal to the television 30. The signal processing unit 4 has an OSD circuit, and displays a menu picture or the like on a monitor of the television 30 by the control of the control unit 1. The television 30 displays video on the monitor such as CRT and outputs audio from a speaker on the basis of the analog signal or digital signal outputted from the signal processing unit 4.

The display unit 7 displays an operation state of the recorder or the like and has an FLD (fluorescence display) or an LED lamp. The manipulation unit 8 is a panel unit having buttons or switches disposed on the front surface or the like of the recorder.

The HDD 9 is hermetically enclosed in a metallic case and has a thermistor sensor 9a (temperature detection device) for detecting the internal temperature of the drive. The HDD 9 has a self-diagnosis function (write verification). When the internal temperature of the hard disk drive detected by the thermistor sensor 9a at the time of recording information is lower than a predetermined lower limit temperature or is higher than a predetermined upper limit temperature, the HDD 9 executes the self-diagnosis function to read out the once recorded information again, thus verifying the contents of the recorded information. In this case, the predetermined lower limit temperature is set to 0° C., for example. This is because if the information is recorded at a temperature lower than 0° C., the information may be improperly recorded. Meanwhile, the predetermined upper limit temperature is set to 60° C., for example. This is because if the information is recorded at a temperature higher than 60° C., the information may be improperly recorded. The fan driving unit 10 controls the cooling fan 10a to be driven or stopped on the basis of the control of the control unit 1.

The remote controller 15 and the manipulation unit 8 are provided with manipulation keys for instructing the recorder, such as play, record, fast forward, rewind, and stop. In addition, the remote controller 15 and the manipulation unit 8 are provided with recording keys for setting a recording reservation (recording timer).

Figure 2:
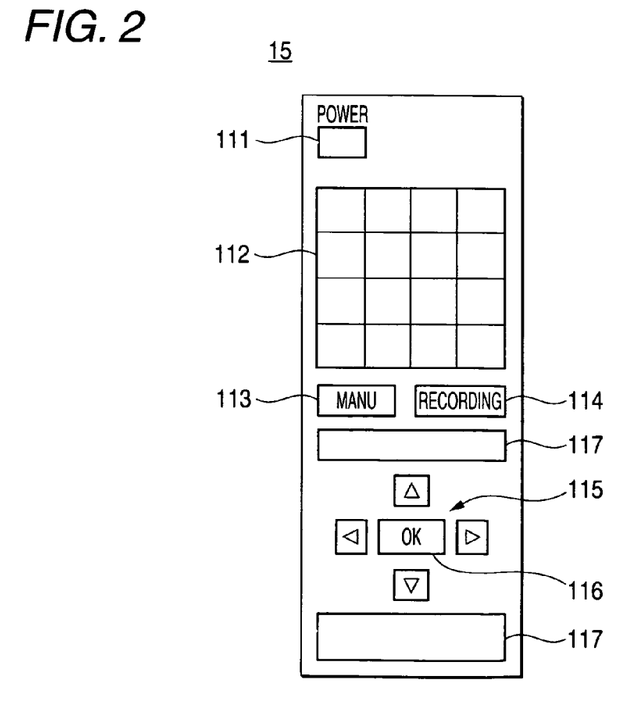
FIG. 2 is a diagram illustrating a key arrangement of a remote controller.

FIG. 2 is a diagram illustrating an example of a key arrangement of the remote controller 15. As shown in FIG. 2, the remote controller 15 is provided with a power key 111, a numeric keypad 112, a menu key 113, a recording key 114, a direction keypad 115, an OK key 116, and various functional keys 117.

For example, when the power key 111 of the remote controller 15 is pressed; a built-in HDD 9 is selected as a recording place; and then the recording key 114 is pressed, the data of program information that is inputted from the outside through the antenna 2 and the tuner 3 and is compressed by the signal processing unit 4 is recorded on a built-in hard disk (not shown) of the HDD 9 by the control unit 1. In this case, when a simultaneous reproduction (i.e., watching television 30) is selected, the recording and reproduction are simultaneously performed; the reproduced data is processed by the signal processing unit 4; and then the processed data is outputted to the television 30. In this manner, while the television program is recorded, video thereof is displayed on the monitor of the television 30 and audio thereof is outputted from the speaker.

When the recording key 114 of the remote controller 15 is pressed or it's a recording starting time of the preset recording reservation, the data of program information that is received by the tuner 3 and is compressed by the signal processing unit 4 is recorded and stored in the hard disk of the HDD 9 by the control 1.

The control unit 1 has a dubbing function from the HDD 9 to the DVD 20. At the time of setting the dubbing mode, it is possible to select any one dubbing mode of "immediate dubbing mode" that the dubbing is immediately performed, "time designated dubbing mode" that a user designates a dubbing performing time to reserve the dubbing, and "automatic dubbing mode" that the recorder sets the dubbing time. This selection is performed by manipulating the keys of the remote controller 15. Since the above-mentioned dubbing process is not a main part of the invention, the description is omitted herein.

The control unit 1 compares the internal temperature information, which is detected by the thermistor sensor 9a and acquired from the HDD 9, with a predetermined reference temperature. As a result of the comparison, when the acquired temperature information is higher than the reference temperature, the control unit 1 notifies the abnormality of the recorder to the display unit 7. In the present embodiment, a first reference temperature (60° C.) and a second reference temperature (70° C.) higher than the first reference temperature by a predetermined temperature are set as the reference temperature, and these reference temperatures are stored in the ROM of the memory unit 1b.

As described above, in the invention, the internal temperature information of the HDD 9 detected by the thermistor sensor 9a of the HDD 9 is used as means for acquiring the internal temperature of the recorder, thereby predicting the state of the internal temperature of the recorder. Accordingly, it is possible to omit the exclusive temperature detection means for detecting the internal temperature of the recorder.

Hereinafter, various embodiments for monitoring the internal temperature of the DVD recorder on the basis of the temperature information acquired from the HDD 9 or the existence information of the write verification will be described in detail.

Embodiment 1

Embodiment 1 is the best basic embodiment for monitoring the internal temperature of the DVD recorder on the basis of the temperature information acquired from the HDD 9. Hereinafter, Embodiment 1 will be described with reference to a flowchart shown in FIG. 3.

Figure 3:
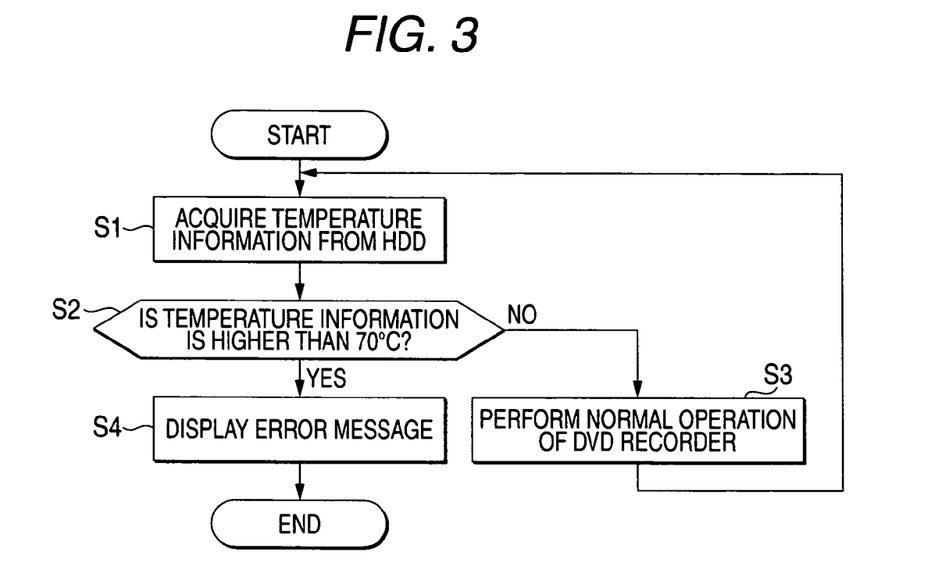
FIG. 3 is a flowchart illustrating a process of monitoring a temperature in a DVD recorder according to Embodiment 1.

When the recorder starts various operations such as a recording operation of information or a dubbing operation, the control unit 1 regularly (or occasionally) acquires the temperature information from the HDD 9 (Step S1). Then, the control unit 1 compares the acquired temperature information with the reference temperature predetermined therein (Step S2). In Embodiment 1, the reference temperature is set to 70° C. That is, to execute the write verification when the temperature of the HDD 9 is higher than 60° C., the reference temperature is set to 70° C. higher than the write verification executing temperature by 10° C. (predetermined temperature described in Claims).

As a result, when the acquired temperature is not higher than 70° C. (Step S2: No), it is judged that the internal temperature of the recorder does not reach the upper limit temperature and thus the normal operation is continuously performed at this time (Step S3).

Alternatively, when the acquired temperature is higher than 70° C. (Step S2: Yes), it is judged that the internal temperature of the recorder is also close to the upper limit temperature and thus the control unit 1 controls the display unit 7 to display an error message (Step S4). In this case, the error message may be displayed by the use of various messages such as "The internal temperature of the recorder abnormally rises"; "Once, please power down"; or "Please contact a service center". In addition to the displaying of the message by the use of the letters as described above, the error message may be, for example, a warning sound using an electronic buzzer, a warning indication turning on or off an LED, or a warning voice using voice synthesis.

As described above, the internal temperature of the recorder is predicted on the basis of the temperature information acquired from the HDD 9. Accordingly, it is possible to monitor the internal temperature of the recorder without requiring the exclusive temperature detection means for detecting the internal temperature of the recorder.

Embodiment 2

Embodiment 2 is an embodiment in which the error message is displayed in two steps. Hereinafter, Embodiment 2 will be described with reference to a flowchart shown in FIG. 4.

Figure 4:
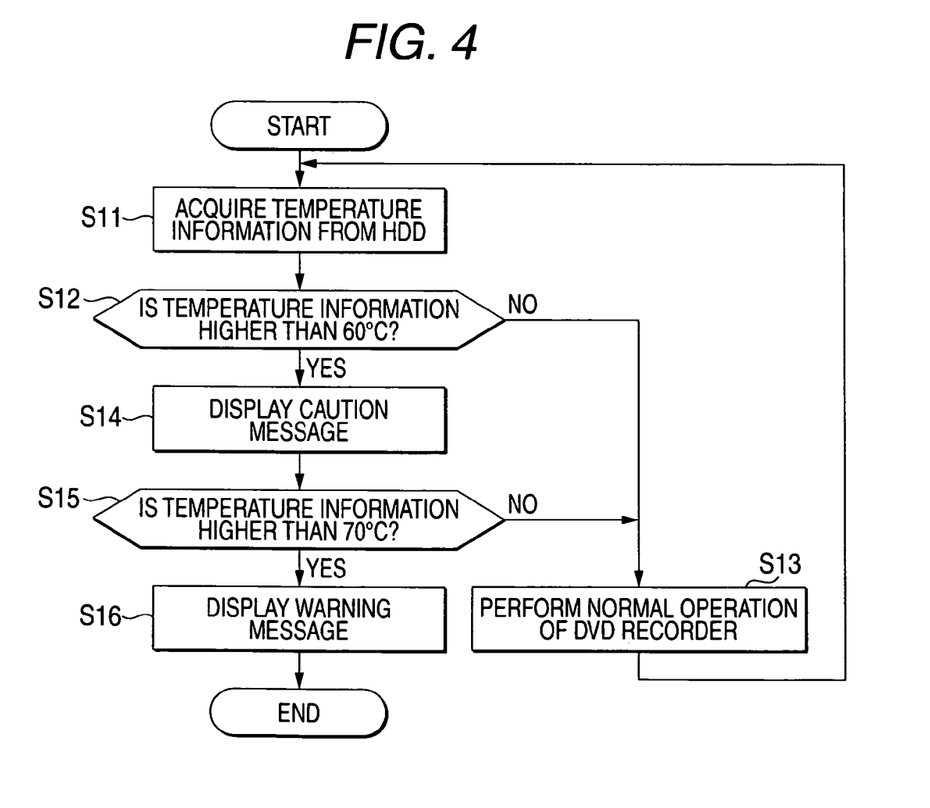
FIG. 4 is a flowchart illustrating a process of monitoring a temperature in a DVD recorder according to Embodiment 2.

When the recorder starts various operations such as a recording operation of information or a dubbing operation, the control unit 1 regularly (or occasionally) acquires the temperature information from the HDD 9 (Step S11). Then, the control unit 1 compares the acquired temperature information with the first reference temperature predetermined therein (Step S12). In Embodiment 2, the first reference temperature is set to 60° C. That is, to execute the write verification when the temperature of the HDD 9 is higher than 60° C., the first reference temperature is set to the write verification executing temperature.

As a result, when the acquired temperature is not higher than 60° C. (Step S12: No), it is judged that the internal temperature of the recorder does not reach the upper limit temperature and thus the normal operation is continuously performed at this time (Step S13).

Alternatively, when the acquired temperature is higher than 60° C. (Step S12: Yes), it is judged that the internal temperature of the recorder staffs to be also close to the upper limit temperature and thus the control unit 1 controls the display unit 7 to display a caution message (Step S14). The caution message indicates a first alert level to notify the abnormality of the recorder.

In this case, the caution message may be displayed by the use of various messages such as "The internal temperature of the recorder starts to rise. Please be careful". In addition to the displaying of the message by the use of the letters as described above, the caution message may be, for example, a warning sound using an electronic buzzer, a warning indication turning on or off an LED, or a warning voice using voice synthesis.

Then, the control unit 1 compares the acquired temperature with the second reference temperature (Step S15). In Embodiment 2, the second reference temperature is set to 70° C. That is, the second reference temperature is set to the temperature higher than the write verification executing temperature by 10° C. (the predetermined temperature described in Claims).

As a result, when the acquired temperature is not higher than 70° C. (Step S15: No), it is judged that the internal temperature of the recorder does not reach the upper limit temperature and thus the normal operation is continuously performed at this time (Step S13).

Alternatively, when the acquired temperature is higher than 70° C. (Step S15: Yes), it is judged that the internal temperature of the recorder is also close to the upper limit temperature and thus the control unit 1 controls the display unit 7 to display a warning message (Step S16). The warning message indicates a second alert level which is higher than the first alert level to notify the abnormality of the recorder.

In this case, the warning message may be displayed by the use of various messages such as "The internal temperature of the recorder abnormally rises"; "Once, please power down"; or "please contact a service center". In addition to the displaying of the message by the use of the letters as described above, the warning message may be, for example, a warning sound using an electronic buzzer, a warning indication turning on or off an LED, or a warning voice using voice synthesis.

As described above, the internal temperature of the recorder is predicted on the basis of the temperature information acquired from the HDD 9 and the executing temperature of the write verification of the HDD 9. Accordingly, it is possible to monitor the internal temperature of the recorder without requiring the exclusive temperature detection means for detecting the internal temperature of the recorder.

Embodiment 3

Embodiment 3 is an embodiment where a driving control for the cooling fan 10*a* is added to Embodiment 2. Hereinafter, Embodiment 3 will be described with reference to a flowchart shown in FIG. 5.

Figure 5:
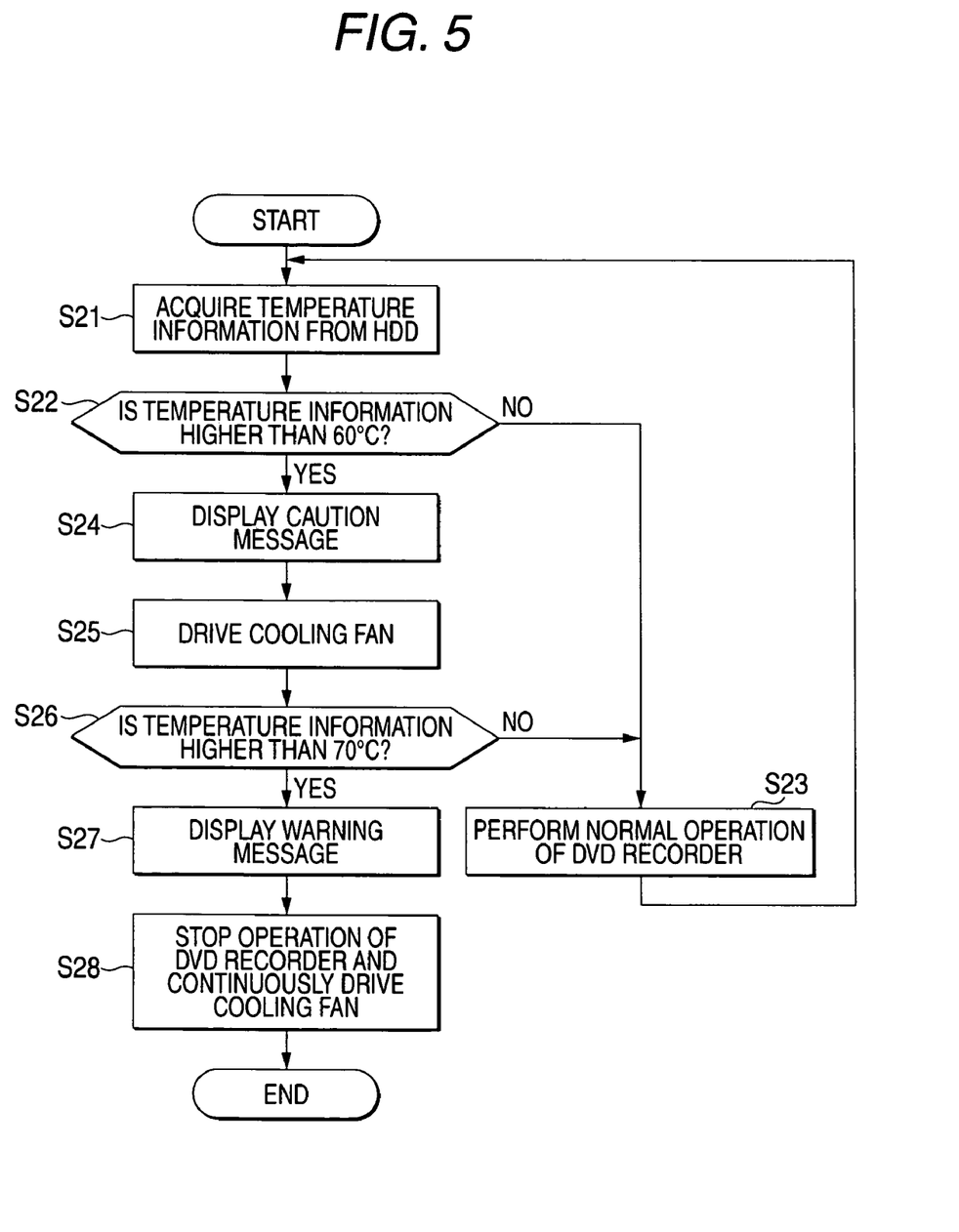
FIG. 5 is a flowchart illustrating a process of monitoring a temperature in the DVD recorder according to Embodiment 3.

When the recorder starts various operations such as a recording operation of information or a dubbing operation, the control unit 1 regularly (or occasionally) acquires the temperature information from the HDD 9 (Step S21). Then, the control unit 1 compares the acquired temperature information with the first reference temperature of 60° C. predetermined therein (Step S22). As a result, when the acquired temperature is not higher than 60° C. (Step S22: No), it is judged that the internal temperature of the recorder does not reach the upper limit temperature and thus the normal operation is continuously performed at this time (Step S23).

Alternatively, when the acquired temperature is higher than 60° C. (Step S22: Yes), it is judged that the internal temperature of the recorder starts to be also close to the upper limit temperature, and thus the control unit 1 controls the display unit 7 to display a caution message (Step S24) and controls the fan driving unit 10 to drive the cooling fan 10*a* (Step S25).

Then, the control unit 1 compares the acquired temperature with the second reference temperature of 70° C. (Step S26). As a result, when the acquired temperature is not higher than 70° C. (Step S26: No), it is judged that the internal temperature of the recorder does not reach the upper limit temperature and thus the normal operation is continuously performed at this time (Step S23).

Alternatively, when the acquired temperature is higher than 70° C. (Step S26: Yes), it is judged that the internal temperature of the recorder is also close to the upper limit temperature and thus the control unit 1 controls the display unit 7 to display a warning message (Step S27). In addition, the control unit 1 stops the operation of the recorder (Step S28). In this case, the cooling fan 10*a* may be continuously driven. Accordingly, it is possible to forcibly lower the internal temperature of the recorder.

As described above, the internal temperature of the recorder is predicted on the basis of the temperature information acquired from the HDD 9 and the executing temperature of the write verification of the HDD 9. Accordingly, it is possible to monitor the internal temperature of the recorder without requiring the exclusive temperature detection means for detecting the internal temperature of the recorder. Since there may be a case in which the cooling fan 10*a* is not actually operating in a lock state due to failures caused by natural deterioration with life or maintenance faults, the malfunction of the cooling fan 10*a* can be promptly found out by judging the increase in temperature after driving the cooling fan 10*a*.

Embodiment 4

Embodiment 4 is an embodiment capable of monitoring the temperature with a higher precision by adding the judgment whether the executing or non-executing of the write verification, which is acquired from the HDD 9, to Embodiment 1. Hereinafter, Embodiment 4 will be described with reference to a flowchart shown in FIG. 6.

Figure 6:
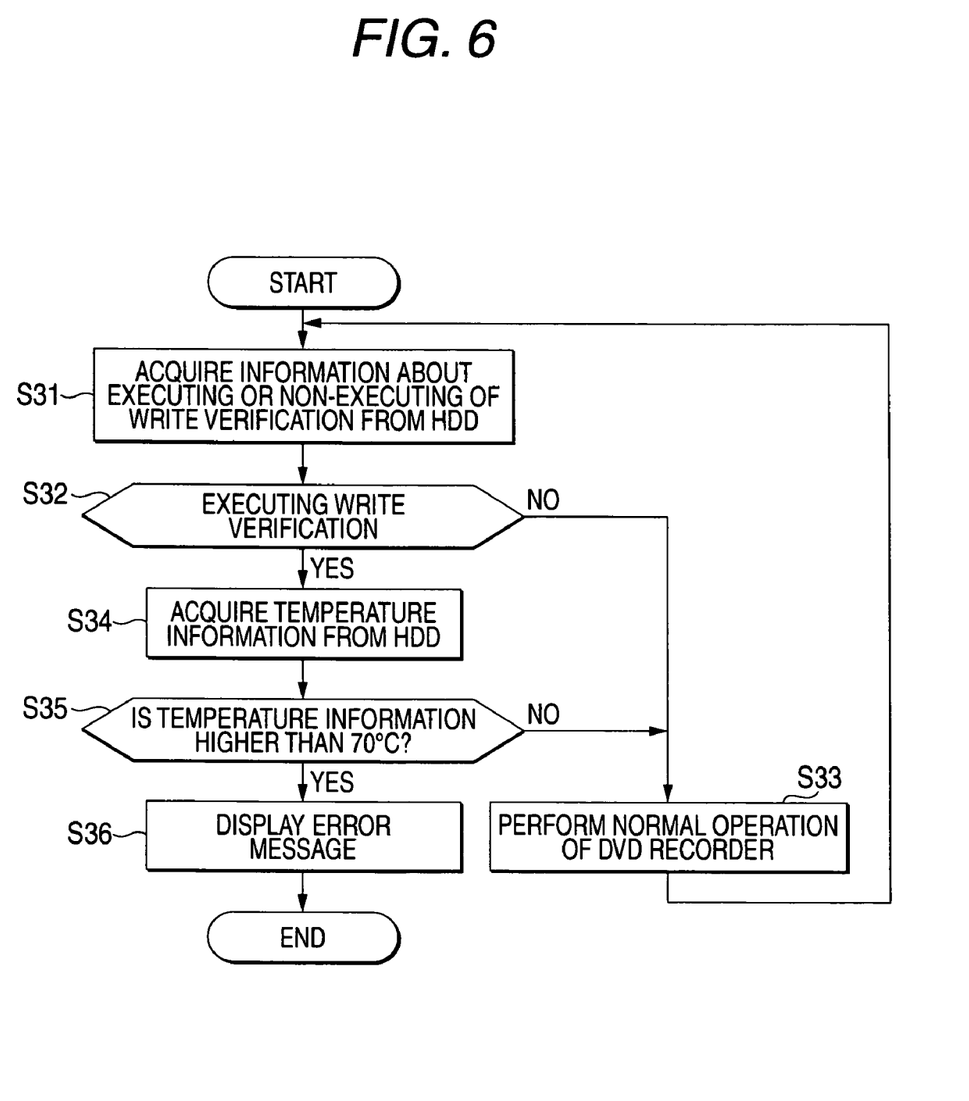
FIG. 6 is a flowchart illustrating a process of monitoring a temperature in the DVD recorder according to Embodiment 4.

When the recorder starts various operations such as an information recording operation or a dubbing operation, the control unit 1 regularly (or occasionally) acquires information about the executing or non-executing of the write verification from the HDD 9 (Step S31). When the HDD 9 does not yet execute the write verification (Step S32: No), it is judged that the internal temperature of the recorder does not reach the upper limit temperature and thus the normal operation is continuously performed at this time (Step S33).

Alternatively, when the HDD 9 has executed the write verification (Step S32: Yes), the control unit 1 regularly (or occasionally) acquires the temperature information from the HDD 9 (S34). Then, the control unit 1 compares the acquired temperature information with the reference temperature predetermined therein (Step S35). In Embodiment 4, the reference temperature is set to 70° C. That is, the reference temperature is set to a temperature higher than the write verification executing temperature by 10° C.

As a result, when the acquired temperature is not higher than 70° C. (Step S35: No), it is judged that the internal temperature of the recorder does not reach the upper limit temperature and thus the normal operation is continuously performed at this time (Step S33).

Alternatively, when the acquired temperature is higher than 70° C. (Step S2: Yes), it is judged that the internal temperature of the recorder is also dose to the upper limit temperature and thus the control unit 1 controls the display unit 7 to display an error message (Step S36). In this case, the error message may be displayed by the use of various messages such as "The internal temperature of the recorder abnormally rises"; "Once, please power down"; or "Please contact a service center". In addition to the displaying of the message by the use of the letters as described above, the error message may be, for example, a warning sound using an electronic buzzer, a warning indication turning on or off an LED, or a warning voice using voice synthesis.

As described above, the internal temperature of the recorder is predicted on the basis of the information about the executing or non-executing of the write verification and the temperature information acquired from the HDD 9. Accordingly, it is possible to monitor the internal temperature of the recorder without requiring the exclusive temperature detection means for detecting the internal temperature of the recorder.

Embodiment 5

Embodiment 5 is an embodiment capable of monitoring the temperature with a higher precision by adding the judgment whether the executing or non-executing of the write verification, which is acquired from the HDD 9, to Embodiment 2. Hereinafter, Embodiment 5 will be described with reference to a flowchart shown in FIG. 7.

Figure 7:
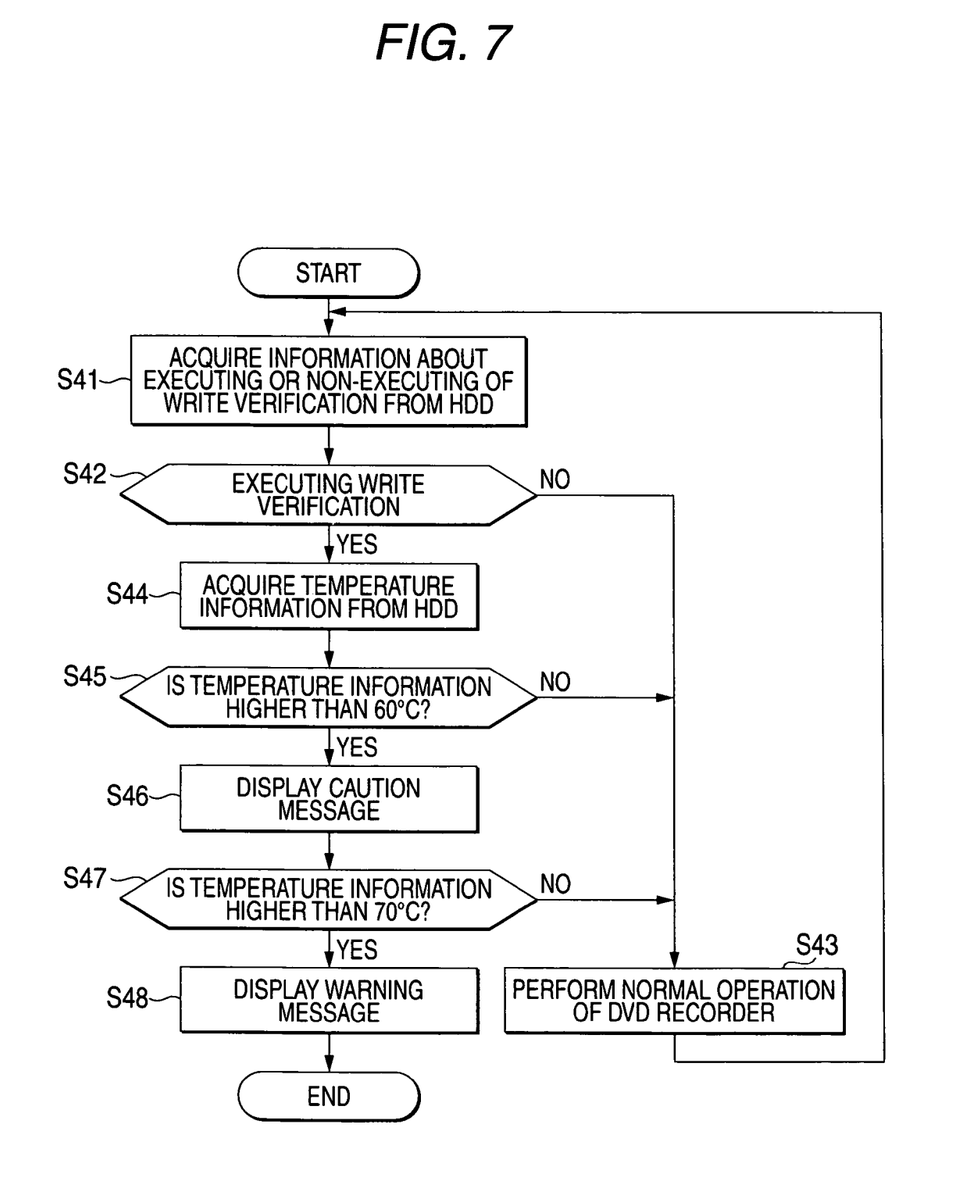
FIG. 7 is a flowchart illustrating a process of monitoring a temperature in the DVD recorder according to Embodiment 5.

When the recorder starts various operations such as an information recording operation or a dubbing operation, the control unit 1 regularly (or occasionally) acquires information about the executing or non-executing of the write verification from the HDD 9 (Step S41). When the HDD 9 does not yet execute the write verification (Step S42: No), it is judged that the internal temperature of the recorder does not reach the upper limit temperature and thus the normal operation is continuously performed at this time (Step S43).

Alternatively, when the HDD 9 has executed the write verification (Step S42: Yes), the control unit 1 regularly (or occasionally) acquires the temperature information from the HDD 9 (S44). Then, the control unit 1 compares the acquired temperature information with the first reference temperature predetermined therein (Step S45). In Embodiment 5, the first reference temperature is set to the write verification temperature of 60° C.

As a result, when the acquired temperature is not higher than 60° C. (Step S45: No), it is judged that the internal temperature of the recorder does not reach the upper limit temperature and thus the normal operation is continuously performed at this time (Step S43).

Alternatively, when the acquired temperature is higher than 60° C. (Step S45: Yes), it is judged that the internal temperature of the recorder starts to be also close to the upper limit temperature and thus the control unit 1 controls the display unit 7 to display a caution message (Step S46). In this case, the caution message may be displayed by the use of various messages such as "The internal temperature of the recorder starts to rise. Please be careful". In addition to the displaying of the message by the use of the letters as described above, the caution message may be, for example, a warning sound using an electronic buzzer, a warning indication turning on or off an LED, or a warning voice using voice synthesis.

Then, the control unit 1 compares the acquired temperature with the second reference temperature (Step S47). In Embodiment 5, the second reference temperature is set to 70° C. higher than the write verification executing temperature by 10° C. (predetermined temperature described in Claims).

As a result, when the acquired temperature is not higher than 70° C. (Step S47: No), it is judged that the internal temperature of the recorder does not reach the upper limit temperature and thus the normal operation is continuously performed at this time (Step S43).

Alternatively, when the acquired temperature is higher than 70° C. (Step S47: Yes), it is judged that the internal temperature of the recorder is also dose to the upper limit temperature and thus the control unit 1 controls the display unit 7 to display a warning message (Step S48). In this case, the warning message may be displayed by the use of various messages such as "The internal temperature of the recorder abnormally rises"; "Once, please power down"; or "Please contact a service center". In addition to the displaying of the message by the use of the letters as described above, the warning message may be, for example, a warning sound using an electronic buzzer, a warning indication turning on or off an LED, or a warning voice using voice synthesis.

As described above, the internal temperature of the recorder is predicted on the basis of the information about the executing or non-executing of the write verification and the temperature information acquired from the HDD 9. Accordingly, it is possible to monitor the internal temperature of the recorder without requiring the exclusive temperature detection means for detecting the internal temperature of the recorder.

Embodiment 6

Embodiment 6 is an embodiment capable of monitoring the temperature with a higher precision by adding the judgment whether the executing or non-executing of the write verification, which is acquired from the HDD 9, to Embodiment 3. Hereinafter, Embodiment 6 will be described with reference to a flowchart shown in FIG. 8.

Figure 8:
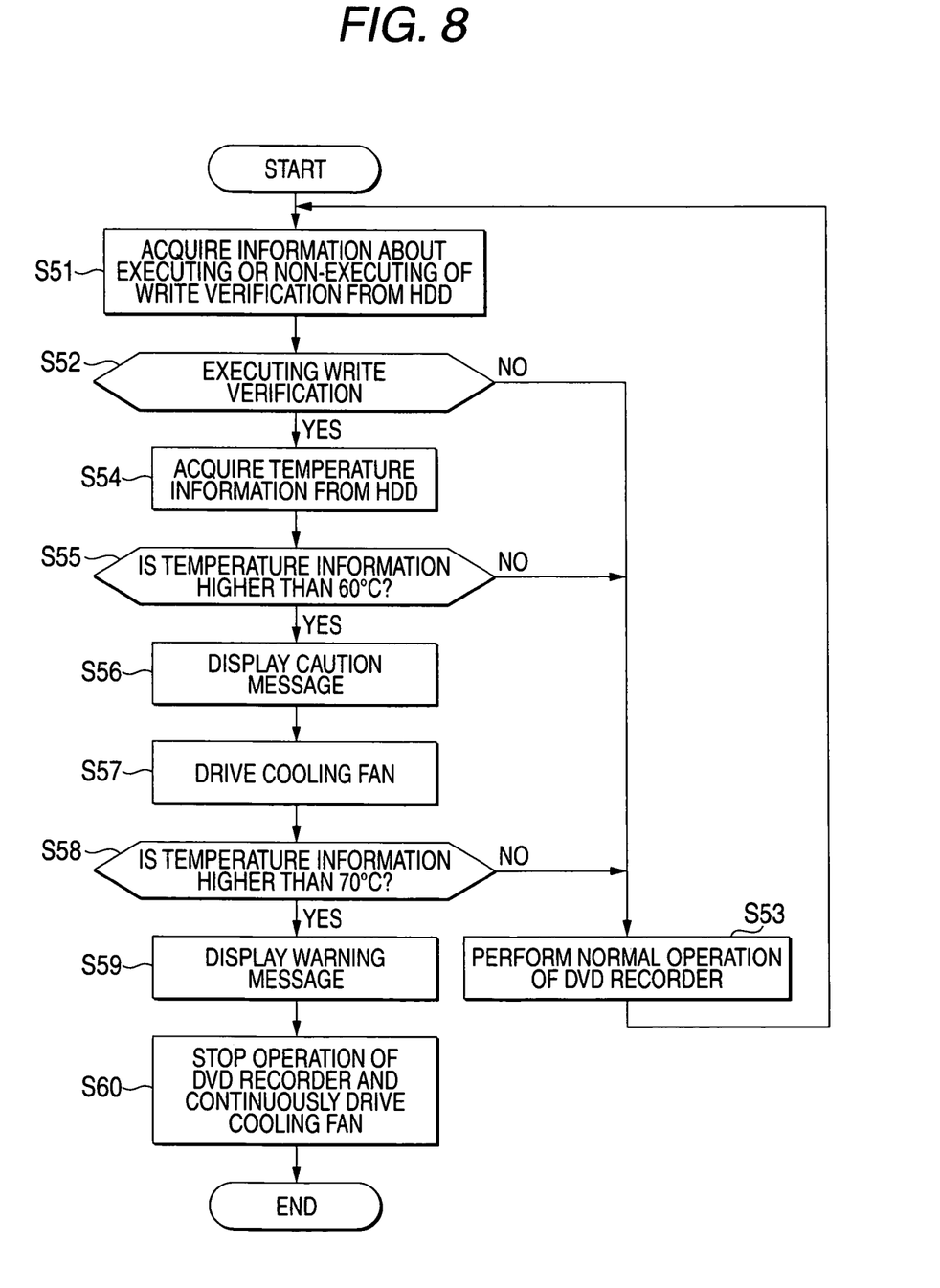
FIG. 8 is a flowchart illustrating a process of monitoring a temperature in the DVD recorder according to Embodiment 6.

When the recorder starts various operations such as an information recording operation or a dubbing operation, the control unit 1 regularly (or occasionally) acquires information about the executing or non-executing of the write verification from the HDD 9 (Step S51). When the HDD 9 does not yet execute the write verification (Step S52: No), it is judged that the internal temperature of the recorder does not reach the upper limit temperature and thus the normal operation is continuously performed at this time (Step S53).

Alternatively, when the HDD 9 has executed the write verification (Step S52: Yes), the control unit 1 regularly (or occasionally) acquires the temperature information from the HDD 9 (S54). Then, the control unit 1 compares the acquired temperature information with the first reference temperature of 60° C. predetermined therein (Step S55). As a result, when the acquired temperature is not higher than 60° C. (Step S55: No), it is judged that the internal temperature of the recorder does not reach the upper limit temperature and thus the normal operation is continuously performed at this time (Step S53).

Alternatively, when the acquired temperature is higher than 60° C. (Step S55: Yes), it is judged that the internal temperature of the recorder starts to be also dose to the upper limit temperature, and thus the control unit 1 controls the display unit 7 to display a caution message (Step S56) and controls the fan driving unit 10 to drive the cooling fan 10*a* (Step S57).

Then, the control unit 1 compares the acquired temperature with the second reference temperature of 70° C. (Step S58). As a result, when the acquired temperature is not higher than 70° C. (Step S58: No), it is judged that the internal temperature of the recorder does not reach the upper limit temperature and thus the normal operation is continuously performed at this time (Step S53).

Alternatively, when the acquired temperature is higher than 70° C. (Step S58: Yes), it is judged that the internal temperature of the recorder is also close to the upper limit temperature and thus the control unit 1 controls the display unit 7 to display a warning message (Step S59). In addition, the control unit 1 stops the operation of the recorder (Step S60). In this case, the cooling fan 10*a* may be continuously driven. Accordingly, it is possible to forcibly lower the internal temperature of the recorder.

As described above, the internal temperature of the recorder is predicted on the basis of the information about the executing or non-executing of the write verification and the temperature information acquired from the HDD 9. Accordingly, it is possible to monitor the internal temperature of the recorder without requiring the exclusive temperature detection means for detecting the internal temperature of the recorder. Since there may be a case in which the cooling fan 10*a* is not actually operating in a lock state due to failures caused by natural deterioration with life or maintenance faults, the malfunction of the cooling fan 10*a* can be promptly found out by judging the increase in temperature after driving the cooling fan 10*a*.

What is claimed is:

1. An electronic apparatus in which a hard disk device having a thermistor sensor operable to detect a temperature in the hard disk device is incorporated, wherein when the hard disk device records information, in a case where the temperature detected by the thermistor sensor is higher than a predetermined temperature, the hard disk device executes self-diagnostic function to read out and verify recorded information, the electronic apparatus comprising:
   controlling section operable to control functions of the electronic apparatus;
   a notifying section operable to notify an abnormality of the electronic apparatus; and
   a fan operable to cool the electronic apparatus, wherein:
   the controlling section determines whether the hard disk device executes the self-diagnostic function;
   the controlling section acquires the temperature detected by the thermistor sensor from the hard disk device when the controlling section determines that the hard disk device executes the self-diagnostic function; and
   when the acquired temperature is higher than a first reference temperature, the controlling section activates the fan and controls the notifying section to output a caution message indicating a first alert level to notify the abnormality of the electronic apparatus; and
   when the acquired temperature is higher than a second reference temperature which is higher than the first reference temperature, the controlling section forcibly deactivates the electronic apparatus and controls the notifying section to output a warning message indicating a second alert level which is higher than the first alert level to notify the abnormality of the electronic apparatus.

2. An electronic apparatus in which a hard disk device having a temperature detection device operable to detect a temperature in the hard disk device is incorporated, the electronic apparatus comprising:
   a controlling section operable to control functions of the electronic apparatus; and
   a notifying section operable to notify an abnormality of the electronic apparatus, wherein:
   the controlling section acquires the temperature detected by the temperature detection device from the hard disk device;
   the controlling section controls the notifying section to notify the abnormality of the electronic apparatus when the acquired temperature is higher than a reference temperature;
   the reference temperature includes a first reference temperature and a second reference temperature which is higher than the first reference temperature;
   the controlling section controls the notifying section to output a caution message indicating a first alert level to notify the abnormality of the electronic apparatus when the acquired temperature is higher than the first reference temperature; and
   the controlling section controls the notifying section to output a warning message indicating a second alert level which is higher than the first alert level to notify the abnormality of the electronic apparatus when the acquired temperature is higher than the second reference temperature.

3. The electronic apparatus as set forth in claim 2, further comprising a fan operable to cool the electronic apparatus, wherein the controlling section activates the fan when the acquired temperature is higher than the first reference temperature.

4. The electronic apparatus as set forth in claim 3, wherein the controlling section forcibly deactivates the electronic apparatus when the acquired temperature is higher than the second reference temperature.

5. The electronic apparatus as set forth in claim 4, wherein the controlling section keeps the fan activated when the electronic apparatus is forcibly deactivated.

6. An electronic apparatus in which a hard disk device having a temperature detection device operable to detect a temperature in the hard disk device is incorporated, wherein when the hard disk device records information, in a case where the temperature detected by the temperature detection device is higher than a predetermined temperature, the hard disk device executes self-diagnostic function to read out and verify recorded information, the electronic apparatus comprising:
   controlling section operable to control functions of the electronic apparatus; and
   a notifying section operable to notify an abnormality of the electronic apparatus, wherein:
   the controlling section determines whether the hard disk device executes the self-diagnostic function;

the controlling section acquires the temperature detected by the temperature detection device from the hard disk device when the controlling section determines that the hard disk device executes the self-diagnostic function; and the controlling section controls the notifying section to notify the abnormality of the electronic apparatus when the acquired temperature is higher than a reference temperature.

7. The electronic apparatus as set forth in claim 6, wherein:

the reference temperature includes a first reference temperature and a second reference temperature which is higher than the first reference temperature;

the controlling section controls the notifying section to output a caution message indicating a first alert level to notify the abnormality of the electronic apparatus when the acquired temperature is higher than the first reference temperature;

the controlling section controls the notifying section to output a warning message indicating an second alert level which is higher than the first alert level to notify the abnormality of the electronic apparatus when the acquired temperature is higher than the second reference temperature.

8. The electronic apparatus as set forth in claim 7, further comprising a fan operable to cool the electronic apparatus, wherein the controlling section activates the fan when the acquired temperature is higher than the first reference temperature.

9. The electronic apparatus as set forth in claim 8, wherein the controlling section forcibly deactivates the electronic apparatus when the acquired temperature is higher than the second reference temperature.

10. The electronic apparatus as set forth in claim 9, wherein the controlling section keeps the fan activated when the electronic apparatus is forcibly deactivated.

\* \* \* \* \*